Aug. 18, 1953   W. H. STOUT ET AL   2,649,105
SELF-DRAINING PIPE JOINT
Filed July 6, 1948

INVENTOR.
WILLIAM H. STOUT
EMIL S. PEARSON
BY
ATTORNEYS

Patented Aug. 18, 1953

2,649,105

UNITED STATES PATENT OFFICE 2,649,105

SELF-DRAINING PIPE JOINT

William H. Stout and Emil S. Pearson, Portland, Oreg., assignors, by direct and mesne assignments, to Farmland Irrigation Company, Inc., a corporation of California Application July 6, 1948, Serial No. 37,105

4 Claims. (Cl. 137—107)

This invention relates to pipe joints and more particularly to a self-draining pipe joint.

An object of the invention is to provide means in a pipeline whereby the line is maintained against leakage when there is a predetermined fluid pressure therein, and whereby the line is drained of fluid when the operation of the pressurizing source is halted.

Another object of the invention is to provide means in an elongated pipeline, particularly adapted for use with pipelines of the ground-surface irrigation type, for the sealing of the pipeline against leakage when the fluid therein is under dynamic pressure and for the draining of the pipeline when the fluid therein is under static pressure.

A further object of the invention is to provide pipe joints for irrigation pipelines operable upon cessation of operation of the fluid pressurizing source to allow complete drainage of the pipeline to thereby lessen the weight thereof and facilitate movement of the pipeline to a new location.

Still another object of the invention is to provide a pipe joint embodying drainage passageways of such length as to preclude the passage of dirt completely therethrough and into the pipe upon ground movement of the pipe for relocation purposes, and whereby the passage of water through said passageways is effective to wash any dirt therefrom.

Broadly, the embodiment of the invention comprises the provision of one or more drainage channels in the bottom portion of the interjacent surfaces of the overlapped or sleeved ends of two pipe units, and the provision of a gasket having an annular flexible sealing lip carried at the end of the inner pipe, but arranged eccentrically thereto so as to be in contactual engagement at all times with the upper portion of the adjacent surface of the other pipe, and in spaced relation to the side and lower portions of the adjacent surface so as to provide a passageway of progressively increased width in the direction of the bottom of the other pipe. Fluid under static pressure, as after the closing off of the fluid pressurizing source, passes out of the pipe through the described passageway and the drainage channel, while fluid under a predetermined dynamic pressure as when the pressurizing source is in operation and the pipe is full of fluid, is effective to move the sealing lip into full peripheral engagement with the outer pipe to close off the drainage channel and seal the pipe against leakage.

Other objects and advantages of the invention will be apparent from the following description taken in conjunction with the drawing forming part of this specification, and in which.

Figure 1:
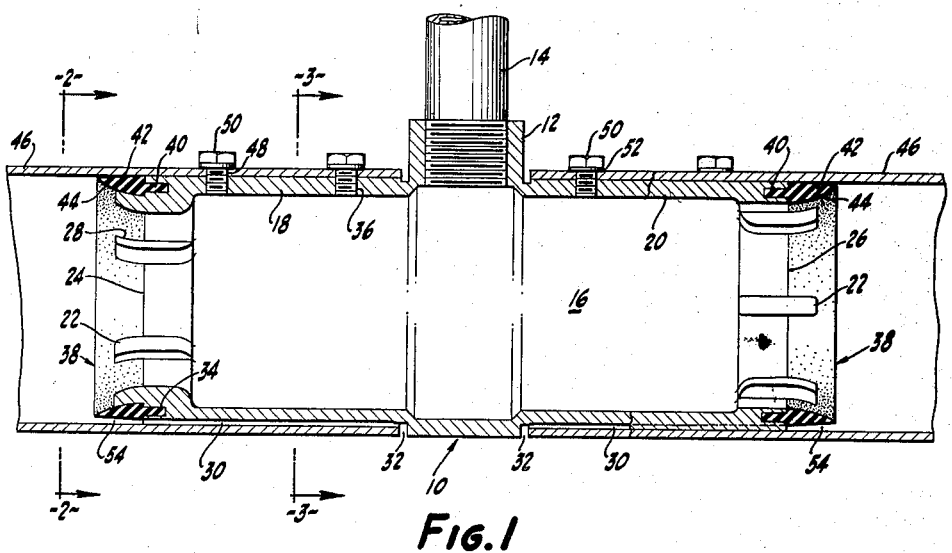
Fig. 1 is a view in longitudinal section of the pipe joint of the invention, the left hand end of the joint being shown as having been taken along lines I—I of Fig. 2, and the right hand end of the joint being shown as having been taken along lines I'—I' of Fig. 2.

Referring to the drawing for more specific details of the invention, the pipe joint comprises a relatively short length of generally cylindrical pipe, indicated generally at 10, having a boss 12 carrying a header pipe 14 in communication with the space 16 within the pipe joint. The pipe joint is preferably symmetrical with respect to the boss 12 and each of the end portions 18 and 20 are provided with a plurality of spaced fingers 22, preferably integral with the pipe joint, and extending beyond the end edges 24 and 26 thereof. The fingers 22 are provided with semiconcave outer surfaces 28. The end portions 18 and 20 of the pipe joint are further characterized by a plurality of spaced relatively long flutings or grooves 30 in the underside thereof extending from the end edges 24 and 26 to circumferential grooves 32 adjacent the boss 12; circular slots 34 in the end edges 24 and 26, said slots being concentric with respect to said end edges; and internally threaded bolt holes 36.

Flexible gaskets 38, preferably of rubber, having rib portions 40 carried within the slots 34 and sealing lip portions 42 eccentric with respect to the rib portions are carried by the pipe joint and are provided with arcuate inner surfaces 44 complementary to the surfaces 28 of the fingers 22. The fingers serve as buttressing elements for the sealing lip portions 42 of the gaskets and prevent inward movement of said portions from their position shown in Figs. 1 and 2.

Pipe lengths 46 adapted to be joined for operative use by the pipe joint 10 are sleeved over the end portions 18 and 20 of the joint until internally threaded bolt holes 48 in said pipe lengths 46 are brought into registry with the bolt holes 36, whereupon the pipe lengths are secured to the joint by bolts 50 threadably engaged with the holes 36 and 48. Washers 52 are interposed between the pipe 46 and the heads of the bolts 50.

The pipe lengths terminate short of the boss 12 so as to leave the circumferential grooves 32 in communication with the atmosphere.

Figure 2:
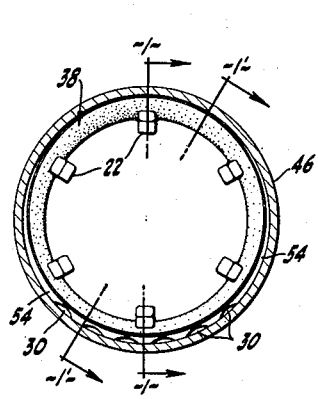
Fig. 2 is a view taken along lines 2—2 of Fig. 1.
Figure 3:
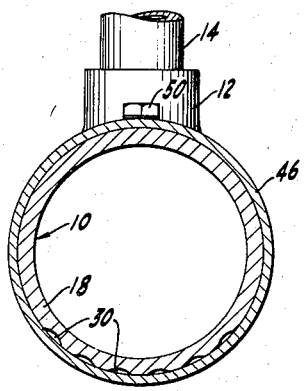
Fig. 3 is a view in section taken along lines 3—3 of Fig. 1.

In the above description of the gaskets 38, mention was made of the eccentricity of the sealing lip portions 42 with respect to the rib portions 40, the latter being concentric with respect to the ends of the pipe joint 10, and it will now be noted that the sealing lip portions 42 are eccentric with respect to the pipe lengths 46, said portions 42 being in engagement with the upper part of the inner surfaces of the pipes 46, but being progressively separated therefrom towards the sides and bottom of the pipes 46 to provide the passage 54 having its maximum transverse dimension at the lowermost parts of the pipes 46, as best shown in Fig. 2, said passage 54 being of sufficient width to disclose the ends of the flutings 30 to provide for communication between the inside of the pipes 46 and pipe joint 10 and the atmosphere through the passage 54, the flutings 30 and the grooves 32.

The pipe joint thus described in primarily intended for use in connection with irrigation pipelines and its purpose is to allow for the automatic drainage of the water from the pipe after use in one position preparatory to the movement of the pipeline to another position by dragging or towing the pipe line with a tractor or the like. Irrigation pipelines are conventionally quite long and if the static water is allowed to remain in them the added weight of the water makes it prohibitive to move the line as a unit without breaking it down into a number of sections and then recoupling the sections in the new location. The pipe joint is operative in the manner hereinafter described.

Assuming that the joint 10 and pipe lengths 46 of Fig. 1 are one of many such combinations interconnected and in position for use for irrigation purposes, and that a source of water supply is connected to the resultant irrigation line through a pump, the incoming water flowing through the pipe will quite rapidly fill the pipe while some of the water passes through the passages 54 and the flutings 30 to the grooves 32 and onto the ground. The flow through the open passageways described will serve to wash the flutings free or dirt which may have been introduced therein while the pipe was being dragged along the ground to its position of present use. It is to be noted that the end portions 18 and 20 of the pipe joint, and therefore the flutings 30, are sufficiently long to render it unlikely that any dirt will have travelled the full length of the flutings and into the passages 54 during the positioning of the pipe.

While the flutings are being washed clean, the water level within the pipe rapidly rises until the water fills the pipe, at which time the effective water pressure urges the sealing lip portions 42 of the gaskets outwardly to close the passages 54 and seal the pipe line against leakage. The passages 54 are progressively closed, that is, first the narrowest or upper portions of the passages are closed by a forcing of the sealing lips of the gaskets against the surfaces of the pipes 46, and the closure proceeds progressively until the passages 54 are closed at their widest or lowermost portions, the gasket opposed to the direction of flow being subjected to greater initial pressure being closed first. If it should happen that the flutings 30 were sufficiently jammed with dirt so that the dirt was not displaced by the water outflow during the filling of the pipe, the progressive closure of the passages 54 to a point where only the ends of the flutings are disclosed will serve to concentrate or focus the effective water pressure along the flutings to eject the difficulty dislodgeable dirt. Until this dirt is dislodged and washed out of the flutings to bring the passages 54 into communication with the atmosphere, the passages will not be fully closed by the sealing lips since the back pressure against complete closing will balance the pressure tending to fully close the passages. It is only when the flutings are free of dirt that the back pressure becomes atmospheric pressure, which is then overbalanced by the fluid pressure force to fully close the passages 54. When the pipe is full of water and sealed against leakage by the gaskets the water is forced into the header pipes 14 to issue from spray heads, or the like, for irrigation purposes.

Following sufficient irrigation of the land adjacent the pipe, the pipe is readied for movement to another position by shutting off the water supply, whereupon the fluid pressure within the pipe drops sufficiently to allow the natural resiliency of the gasket together with the added force of atmospheric pressure overcome the fluid pressure to open the passages 54 in reverse order to the sequence of closing thereof to first disclose the flutings and then the progressively narrower portions of the passages. As the flutings are disclosed the water in the pipe passes therethrough to the grooves 32 and then onto the ground, and the pipe is drained in this manner to decrease its weight for the ensuing dragging operation to relocate the pipe.

It will be understood that the pipe lengths 46 may be provided with the gaskets 38, flutings 30, and grooves 32, and that the end portions 18 and 20 may be provided so that they may be sleeved over the ends of the pipe, and that the location of the essential elements may be otherwise varied within the spirit of the invention to achieve the same desirable results. It is intended, therefore, that the invention be limited only by the scope of the appended claims.

What I claim as new and desire to secure by Letters Patent is:

1. A pipe joint comprising a first pipe secured to a second pipe with an end of each in overlapped contactual relation, at least one channel cut in one of the interjacent surfaces of said pipes and at the lower side of the pipe said channel being open at its outer end to the atmosphere and open at its inner end to the internal space of the pipes, and a pressure responsive gasket carried eccentrically of the end of the inner pipe in contactual engagement with the upper portion of the adjacent surface of the other pipe and in progressively increased spaced relation with respect to said adjacent surface toward the lower portion thereof, said gasket being operative to close off the inner end of said channel from the internal space of said pipes under the action of a predetermined fluid pressure within the pipes.

2. A pipe joint comprising two units of pipe having their adjacent ends in overlapped contactual engagement, flutings in the underside of the inner unit of pipe, said flutings extending from the edge of the overlapped end thereof to substantially the end edge of the overlapping end of the outer unit of pipe, a peripheral groove in the outer surface of the inner unit of pipe, said groove communicating with the atmosphere and with the outer ends of the flutings, a gasket carried by the overlapped end of the inner unit and having an annular sealing lip in engagement with the upper portion of the adjacent surface of the outer unit of pipe, said sealing lip being eccentric with respect to said adjacent surface so as to be in increased spaced relation therewith toward the bottom thereof to provide an arcuate passage communicating with the inner ends of said fluting, said sealing lip being operable under the action of a predetermined fluid pressure within the pipe units to close said arcuate passage and seal said pipe units against drainage.

3. A pipe joint as defined in claim 2 wherein the overlapped end edge of the inner unit of pipe is provided with a plurality of radially spaced support fingers extending therefrom and located radially inwardly of the annular sealing lip, said fingers being adapted to limit inward movement of said lip.

4. A pipe joint of the character described comprising a body portion, a cylindrical pipe-receiving extension of reduced diameter, means for securing a pipe end to said extension in enclosing relation with respect thereto but spaced from said body portion, one or more drain flutes formed in the exterior surface of said extension and extending outwardly from said body portion, and a drain valve having a resilient check valve element movable into and out of closing relationship to an opening of said drain flutes remote from said body portion; said element being exposed to pressure within said joint so as to be moved thereby into closing relationship with said opening and being automatically responsive to a reduction of fluid pressure within said joint to permit residual water therein to drain through said drain flutes.

WILLIAM H. STOUT.
EMIL S. PEARSON.

References Cited in the file of this patent

UNITED STATES PATENTS

| Number | Name | Date |
| --- | --- | --- |
| 1,130,726 | Greve | Mar. 9, 1915 |
| 2,033,467 | Groeniger | Mar. 10, 1936 |
| 2,074,698 | Langdon | Mar. 23, 1937 |
| 2,270,737 | Langdon | Jan. 20, 1942 |

FOREIGN PATENTS

| Number | Country | Date |
| --- | --- | --- |
| 18,268 | Netherlands | of 1928 |